United States Patent
Sampson et al.

(10) Patent No.: US 9,691,374 B2
(45) Date of Patent: Jun. 27, 2017

(54) PROCESSING A STREAM OF ORDERED INPUT DATA

(71) Applicant: THE REGENTS OF THE UNIVERSITY OF MICHIGAN, Ann Arbor, MI (US)

(72) Inventors: Richard Sampson, Ann Arbor, MI (US); Thomas Friedrich Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 90 days.

(21) Appl. No.: 14/646,533

(22) PCT Filed: Nov. 28, 2012

(86) PCT No.: PCT/US2012/066745
§ 371 (c)(1),
(2) Date: May 21, 2015

(87) PCT Pub. No.: WO2014/084817
PCT Pub. Date: Jun. 5, 2014

(65) Prior Publication Data
US 2015/0302844 A1   Oct. 22, 2015

(51) Int. Cl.
*G10K 11/34* (2006.01)
*G01S 15/89* (2006.01)

(52) U.S. Cl.
CPC ........ *G10K 11/341* (2013.01); *G01S 15/8993* (2013.01)

(58) Field of Classification Search
CPC .................... G10K 11/341; G01S 15/8993
See application file for complete search history.

(56) References Cited

U.S. PATENT DOCUMENTS

| 5,841,889 A | 11/1998 | Seyed-Bolorforosh |
| 6,248,073 B1 | 6/2001 | Gilbert et al. |
| (Continued) | | |

OTHER PUBLICATIONS

International Search Report for PCT/US2012/066745, mailed Feb. 1, 2013, 2 pages.

(Continued)

*Primary Examiner* — Daniel Pihulic
(74) *Attorney, Agent, or Firm* — Nixon & Vanderhye P.C.

(57) ABSTRACT

A data processing system is provided for performing processing operations upon an ordered stream of input data values to form an ordered stream of output data values. A select circuit (18) includes select interval generation circuitry (34) which determines a number (interval number) of input data values between each data value to be selected for output from among the ordered stream of input data values. This interval number varies with position within the ordered stream of input data values. The select circuit (18) can thus perform selection of input data values in accordance with an interval number which may be varied, for example, in accordance with a linear piecewise approximation of an desired curve or, in other embodiments, in a piecewise quadratic variation approximating a desired curve. The processing techniques may be used, for example, in beam forming application, such as 3D beam forming of ultrasonic images.

19 Claims, 7 Drawing Sheets

(56) References Cited

U.S. PATENT DOCUMENTS 6,570,537 B2 5/2003 Frey, Jr.
2015/0302844 A1* 10/2015 Sampson ............. G10K 11/341
367/11

OTHER PUBLICATIONS

Written Opinion of the ISA for PCT/US2012/066745, mailed Feb. 1, 2013, 4 pages.
International Preliminary Report on Patentability for PCT/US2012/066745, dated Jan. 25, 2015, 5 pages.

* cited by examiner

PROCESSING A STREAM OF ORDERED INPUT DATA

This application is the U.S. national phase of International Application No. PCT/US2012/066745 filed 28 Nov. 2012, which designated the U.S. the entire content of which is hereby incorporated by reference.

BACKGROUND

This invention relates to the field of data processing systems. More particularly, this invention relates to the processing of a stream of ordered input data to form a stream of ordered output data.

It is known to produce systems which generate a large volume of data in the form of a stream of ordered input data. Such systems included, for example, 3D beam forming imaging devices, such as ultrasonic imaging devices. These devices generate large volumes of data values from the receiving transducers. These data values form a number of streams of ordered input data values. These streams of ordered input data values are then subject, for example, to 3D beam forming processing in accordance with known imaging techniques in order to reconstruct a 3D image of a target object. Typically in known systems the stream ordered input data values are written into a large memory and then for each point of the image to be generated, the appropriate input data values are selected from within the memory and used to generate an output value for the point of interest within the image. Such systems typically require large amounts of memory and large amounts of processing power in order to handle the data volumes typical in imaging of a reasonably high resolution. These overheads increase cost, size and power consumption.

Other forms of processing upon large quantities of data formed of one or more streams of ordered input data are also known. For example, statistical analysis of data, such as bootstrap analysis, may similarly require a disadvantageous amount of processing resource and energy when performed in accordance with conventional techniques that store all of the data into a memory, calculate one or more indexes into that data for a particular point in the output being calculated, fetch the elements of the data from the memory to perform the desired calculations, store the result to a result memory and then iterate for the next point to be calculated.

Techniques which can perform more efficient processing upon streams of ordered input data with less overhead required are advantageous.

SUMMARY

Viewed from one aspect the present invention provides apparatus for processing data comprising:

one of more groups of select circuits, each group of select circuits comprising one or more select circuits and each select circuit comprising:

an input configured to receive an ordered stream of input data values;

select interval generation circuitry configured to determine an interval number of input data values between each data value to be selected for output from among said ordered stream of input data values, said interval number varying with position within said ordered stream of input data values;

an output configured to receive an ordered stream of output data values; and a transfer circuit configured to respond to said interval number by sending each said data value selected for output to said output.

The present technique provides a hardware architecture which enables highly parallelised processing of streams of ordered input data to be performed to generate streams of ordered output data with less required overhead. In particular, the selection of input data values to be supplied as output data values both keeping their original ordering and in accordance with an interval number which varies with position within the ordered stream of input data values permits selection of input data values to be made in a manner which replaces the indexing steps into the whole data set which were previously necessary and incurred overhead.

Whilst the input data values and the output data values need not be stored within the selection circuit, in some embodiments there are provided an input buffer and an output buffer which store portions of the ordered stream of input data values and the ordered stream of output data values respectively. The input buffer and the output buffer may additionally be respectively provided with refill circuitry and drain circuitry which serves to refill the input buffer when all its values have been consumed and to drain the output buffer when it full.

It will be appreciated that the interval number corresponds to a number of input data values to be skipped when passing the stream of ordered input data values select data values to be supplied to the stream of ordered output data values. This number to be skipped is an integer and can be zero. A zero interval number corresponds to an input data value being output more than once. As an example, if a given input data value was selected for output and the next two following interval numbers are both zero, then that given input data value is output two more times before a non-zero interval number results in a subsequent input data value being selected for output.

The flexibility of the select circuitry in performing the desired selection operations may be improved when the select circuitry includes a memory storing a plurality of interval control values with those interval control value being used in the determination of the interval number. The interval control values may be programmable so as to change the manner in which the determination of the interval numbers is performed. For example, in the context of 3D beam forming, different interval control values may be programmed corresponding to different scan lines being extracted from the streams of ordered input values.

The processing overhead associated with the select circuit may be reduced by determining the interval numbers using an iterative calculation whereby each newly calculated number is dependent upon an immediately preceding interval number calculated by the select circuit. In practice such iterative calculation is well suited to many forms of interval calculation that be used for real life processing applications on ordered streams of data values, such as 3D beam forming. The iterative calculation can be supported by relatively simple and efficient processing circuits within the select circuit, such as adders, counters and comparators.

The flexibility of the present techniques may be improved by the provision of transform circuitry configured to perform a transform operation upon an ordered stream of raw data values in order to generate the ordered stream of input data values which are processed by the one or more select circuits. Such transform operations may, for example, include an interpolation operation in which input data values are interpolated at positions between raw data values so as to facilitate further processing.

The select circuitry may be arranged in groups with each of the groups including multiple select circuits. The select circuits of a given group may be connected in parallel to the same transform circuitry and share receipt of an ordered stream of input data therefrom. This sharing of transform circuitry and an ordered stream of input data between multiple select circuits decreases the hardware overhead and energy cost associated with the present techniques.

The select circuits formed into groups produce a number of ordered streams of output data values. In order to produce processing consistent with many desired real life processing tasks, the present techniques may provide a plurality of reduce circuits each coupled to receive one or more ordered streams of output data values from its respective group of select circuits. A group of select circuits thus provides its ordered streams of output data values to one reduce circuit which is responsible for the combination of those streams of output data values with the results generated by other groups of select circuits. While the processing to combine the results from the different groups of select circuits could take a variety of different forms, in some embodiments the reduce circuits are configured to accumulate corresponding output data values across different groups of select circuit. This accumulation is a form of processing which may be used to facilitate, for example, 3D beam forming processing.

The reduce circuits may be connected in a chain with partially accumulated output data values passed between reduce circuits until all of the corresponding output data values have been accumulated and an ordered stream of combined data values has been formed and is ready for output. The accumulation of the partial results in this way permits the parallel formation of multiple ordered streams of combined data values.

It will be appreciated that while the present techniques are not restricted to any particular application, the apparatus and techniques are well suited to performing beam forming computations, such as those that might be used in ultrasound imaging.

Viewed from another aspect the present invention provides apparatus for processing data comprising:

one of more groups of select circuits, each group of select circuits comprising one or more select circuits and each select circuit comprising:

input means for receiving an ordered stream of input data values;

select interval generation means for determining an interval number of input data values between each data value to be selected for output from among said ordered stream of input data values, said interval number varying with position within said ordered stream of input data values;

output means for receiving an ordered stream of output data values; and transfer means for responding to said interval number by sending each said data value selected for output to said output means.

Viewed from a further aspect the present invention provides a method of processing data using one of more groups of select circuits, each group of select circuits comprising one or more select circuits, said method comprising performing the steps within each select circuit of:

receiving an ordered stream of input data values;

determining an interval number of input data values between each data value to be selected for output from among said ordered stream of input data values, said interval number varying with position within said ordered stream of input data values; and responding to said interval number by sending each said data value selected for output to an output.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
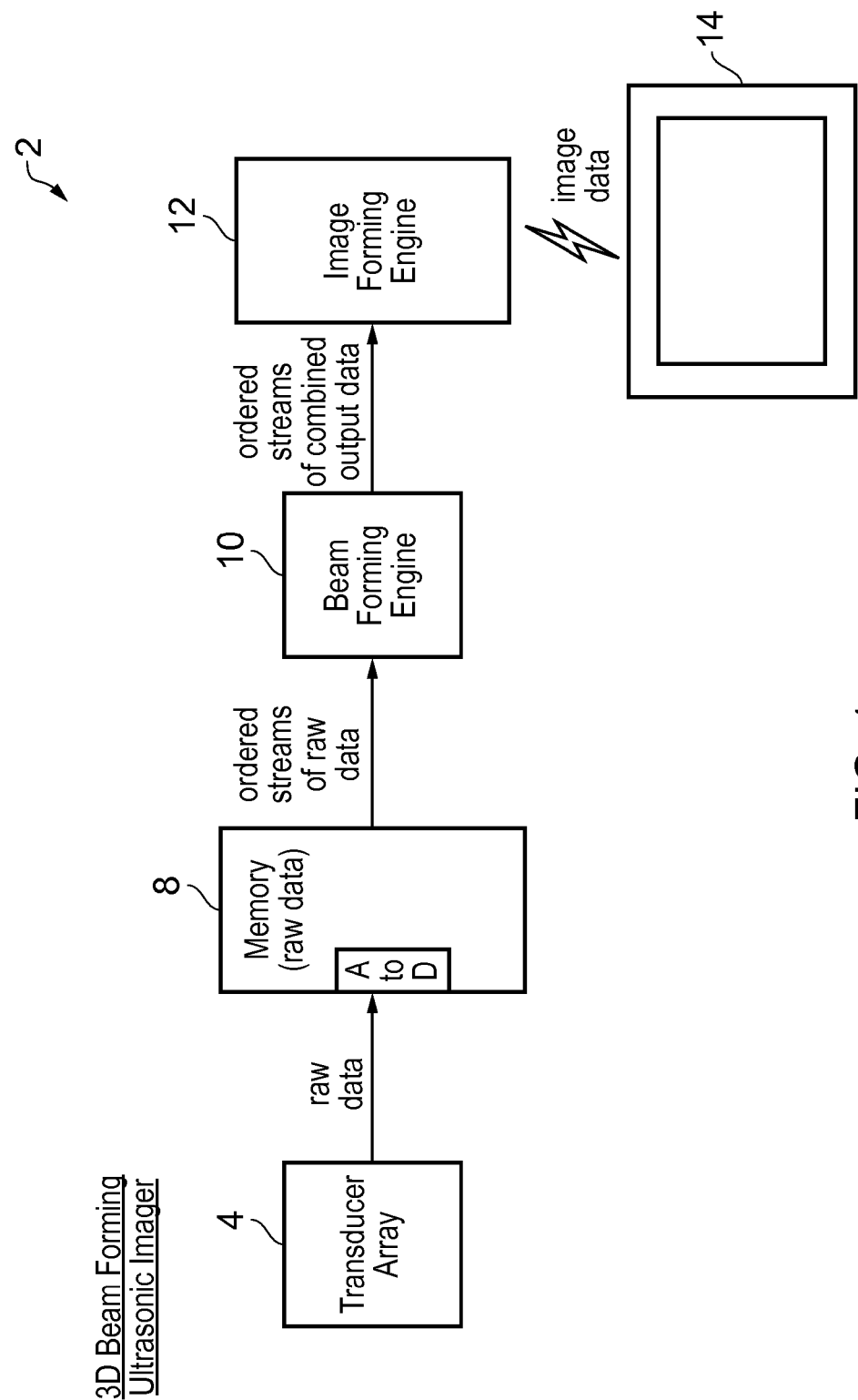
FIG. 1 schematically illustrates a 3D beam forming ultrasonic imager.

FIG. 1 schematically illustrates an apparatus for processing data in the form of a 3D beam forming ultrasonic imager 2. The imager 2 includes a transducer array 4 including multiple ultrasonic transducers which generate raw analogue data which is converted into ordered streams of raw digital data values stored within a memory 8. The ordered streams of raw data values from the memory 8 are read by a beam forming engine 10, which performs stream processing operations in accordance with the present techniques to produce ordered streams of combined output data which are supplied to a image forming engine 12. The image forming engine 12 generates image data which is displayed on a display device 14.

The present techniques are particularly concerned with the form and operation of the beam forming engine 10. This beam forming engine 10 is, in this example, used in an ultrasonic imager, but could be used in other forms of beam forming apparatus. The present techniques are also not limited to beam forming and may be used for other processing tasks, such as the bootstrap statistical analysis as discussed previously.

Figure 2:
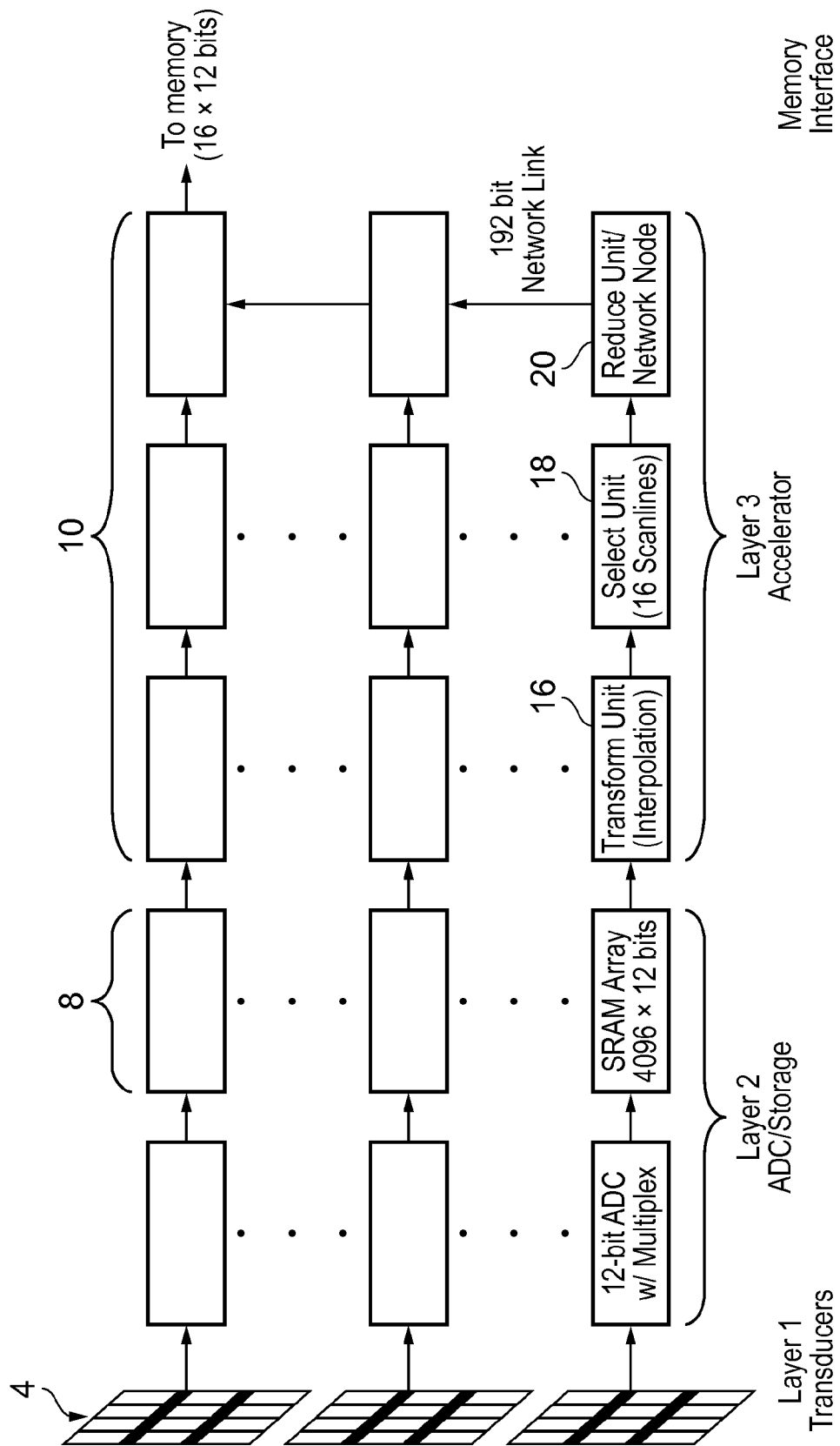
FIG. 2 schematically illustrates data flow through the device of FIG. 1.

FIG. 2 schematically illustrates data flow through the beam forming engine. Analogue data values from the transducer array 4 are converted into digital data values and then stored within the memory 8. These ordered streams of raw data values are then supplied in parallel to transform circuitry 16, select circuitry 18 and reduce circuitry 20 before being written out to a memory within the image forming engine 12. The processing performed by the beam forming engine 10 is highly parallelised. Multiple transform circuitry 16 is provided to perform interpolation upon the audit stream of raw data values to produce interpolated values which form the ordered stream of input data values supplied to the select circuits 18. A group of select circuits 18, in this case sixteen, receive an ordered stream of input data values from a transform circuit 16 and generate respective ordered streams of output data values which are supplied to a shared reduce circuit 20. Each of the data paths may operate at least partially independently so as to reduce processing bottlenecks.

Figure 3:
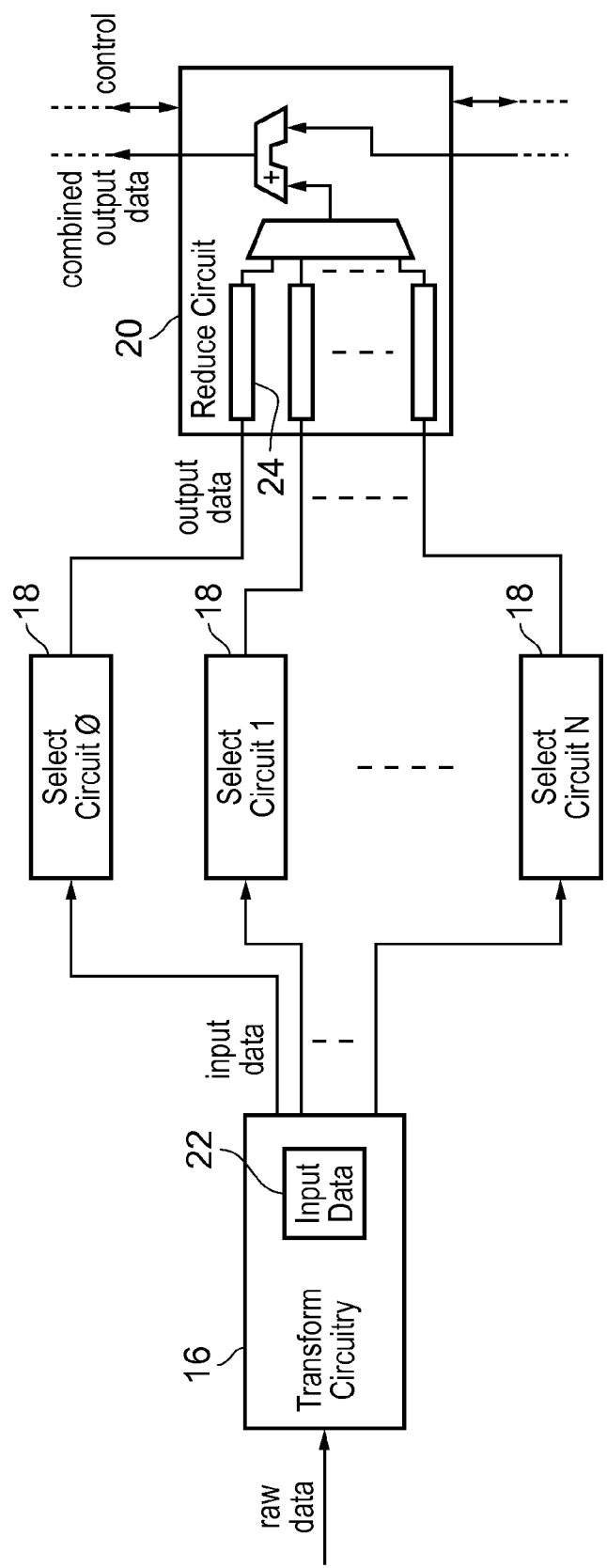
FIG. 3 schematically illustrates a portion of a beam forming engine including transform circuitry, multiple select circuits and a reduce circuit.

FIG. 3 schematically illustrates a portion of the beam forming engine 10. This portion comprises a single instance of the transform circuitry 16, a group of select circuits 18 and a single instance of the reduce circuit 20. The transform circuitry 16 receives an ordered stream of raw data values and performs an interpolation operation to generate an ordered stream of input data values which are stored within a memory 22 of the transform circuitry 16. The different instances of the select circuitry 18 all read the ordered stream of input data values from the memory 22 and select particular data values from amongst this ordered stream of input data values to be supplied as data values within ordered stream of output data values to the reduce circuit 20. The ordered stream of input data values is read by the select circuit 18 in portions and the select circuits 18 assemble portions of their ordered stream of output data values which are then output to the reduce circuit 20. The reduce circuit 20 serves in combination with the other reduced circuits within the data engine to accumulate values at corresponding positions within corresponding ordered streams of output values so as to produce a final ordered stream of combined output data values when all of the accumulated results from all of the reduce circuits 20 have been collected together. In practice a portion of an ordered stream of output data values is stored by a select circuit 18 into a memory 24 of the reduce circuit. When the corresponding memory of an upstream reduce circuit 20 is also full, then its data values are supplied to the following reduce circuit 20 where they are combined with the output data values held at that following reduced circuit. Thus, the portions of the ordered stream of output data values are passed between the reduce circuits 20 that are formed in a chain until a complete circuit of the reduce circuits 20 has been made and the final ordered stream of combined data values are ready for output and further processing, such as by the image forming engine 12.

Figure 4:
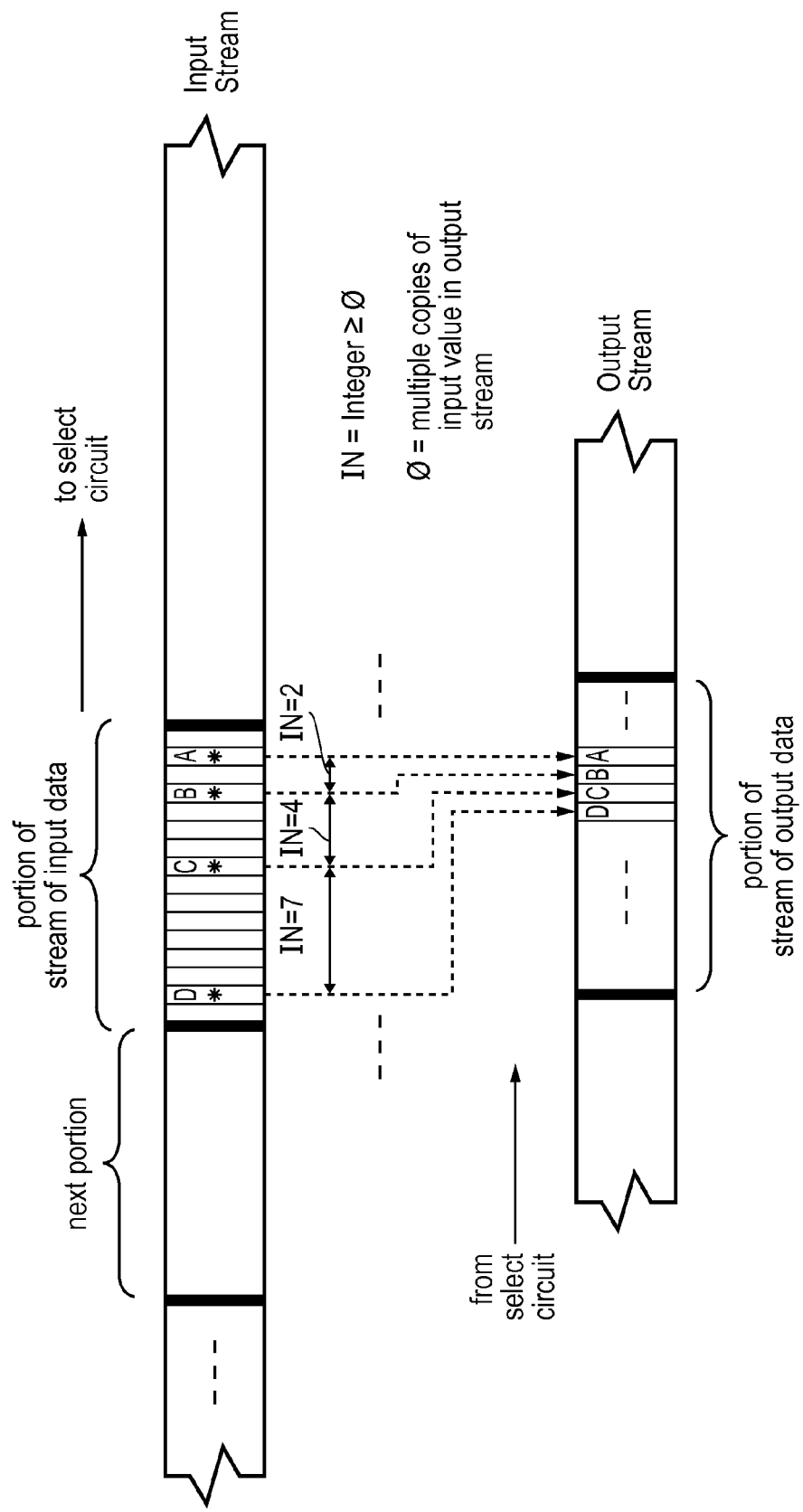
FIG. 4 schematically illustrates the selection of input data values from within an ordered stream of input data values to form an ordered stream of output data values.

FIG. 4 schematically illustrates the selection of input data values from within the input stream to form output data values within the output stream. As illustrated, a select circuit 18 selects particular input data values (as marked with an *) which are transferred to form part of the ordered stream of output data values. The spacing between the selected input data values varies with position within the ordered stream of input data values as illustrated. This spacing corresponds to an interval number which is generated by select interval generation circuitry as will be described further below. When a portion of the ordered stream of input data values has been traversed, then the next portion of the stream of input data values is fetched into the select circuit 18 and further selection of input data values made from this next portion and supplied to the portion of the ordered stream of output data currently being assembled. When a portion of the ordered stream of output data is complete, then this is output from the select circuit 18 to the reduce circuit 20. The reduce circuit 20 accumulates the corresponding portions of the output data stream generated by select circuits 18 in different groups of select circuits associated with different reduce circuits 20.

Figure 5:
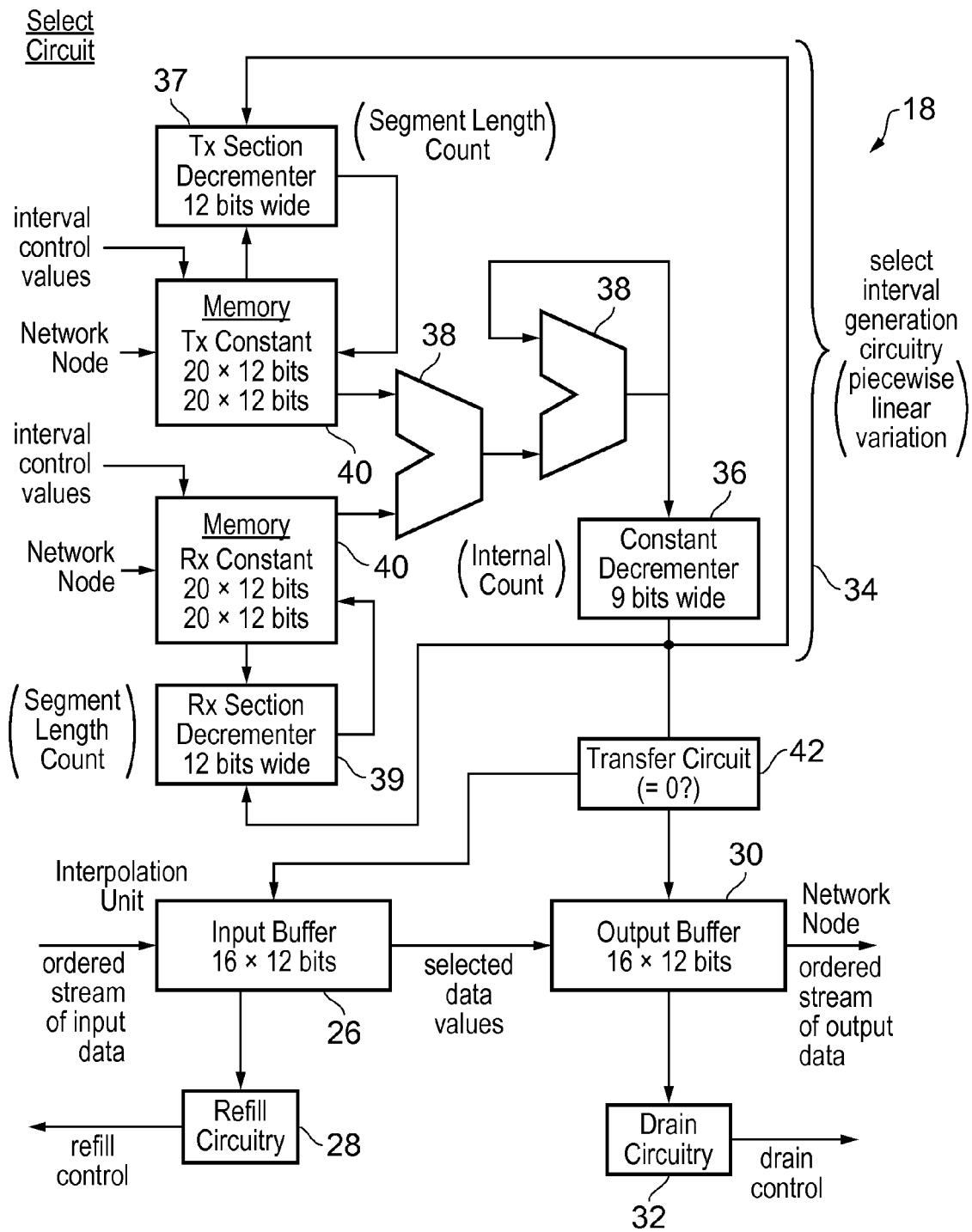
FIG. 5 schematically illustrates one example of a select circuit using a piecewise linear variation in the interval number determined.

FIG. 5 schematically illustrates a select circuit 18 configured to perform a piecewise linear variation in the interval number between selected input data values. Input data values are supplied to an input buffer 26 by refill circuitry 28. The refill circuitry 28 fills the input buffer 26 with a following portion of the stream of input data values when all of the input data values within the input buffer 26 have been traversed in the selection process. Output data values to form a portion of a stream of output data values are collected in an output buffer 30. Drain circuitry 32 is responsible for outputting the contents of the output buffer 30 to the reduce circuitry 20 when the output buffer 30 is full corresponding to a complete portion of the stream of output data values having been assembled.

In this example, the select interval generation circuitry 34 is composed of a collection of decrementing circuits (an interval count decrementer 36 that counts down for each input value and segment length count decrementers 37, 39 that count down when the interval count decrementer 36 selects an input value for output), adders 38 and programmable memories 40. The programmable memories 40 hold constants specifying interval count values and segment length count values for different segments of straight lines being employed in a piecewise linear variation modelling a desired curve controlling the selection of input data values from the input buffer 26 for transfer to the output buffer 30. The decrementer 36 counts down an interval count number and controls a transfer circuit 42 to select an input data value for transfer into the output buffer 30 when the interval count reaches zero. Each time the interval count is decremented, a pointer of position within the input buffer 26 is moved. The interval count is initialised to the interval number being used for the particular linear segment being modelled. Each time the interval count reaches zero and an input value is transferred to the output buffer 3D, the segment length count is decremented and when the end of the segment has been reached the next interval number is selected from within the memories 40 for use by the decrementer 36. The interval numbers and the segment lengths can be programmed as interval control values into the memories 40 so that the piecewise linear variation can be configured to model arbitrary curves.

Figure 6:
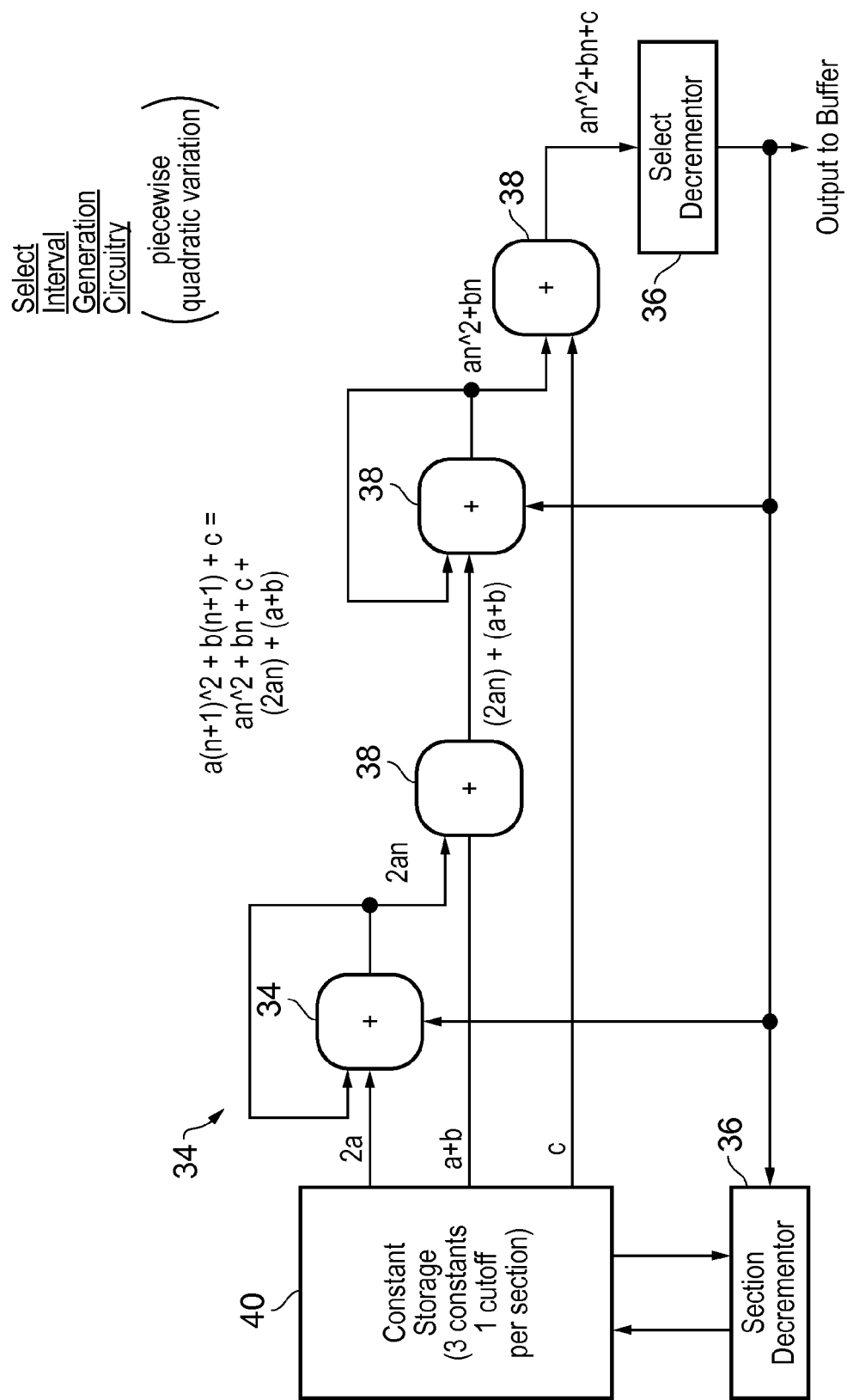
FIG. 6 schematically illustrates interval generation circuitry suitable for controlling a piecewise quadratic variation interval number.

FIG. 6 illustrates a different example embodiment of interval generation circuitry 34. In this example embodiment, a piecewise quadratic variation is used to model an arbitrary curve. The interval generation circuitry again includes decrementers 36, adders 38 and a memory 40 storing programmable interval control values defining the shape of the segments of the quadratic curve being used for the piecewise quadratic variation of interval number.

It will be appreciated that the interval generation circuitry 34 illustrated in both FIGS. 5 and 6 performs an iterative calculation with each newly calculated interval number being dependent upon an immediately preceding interval number that was calculated within the interval generations circuitry 34 of the select circuit 18.

Figure 7:
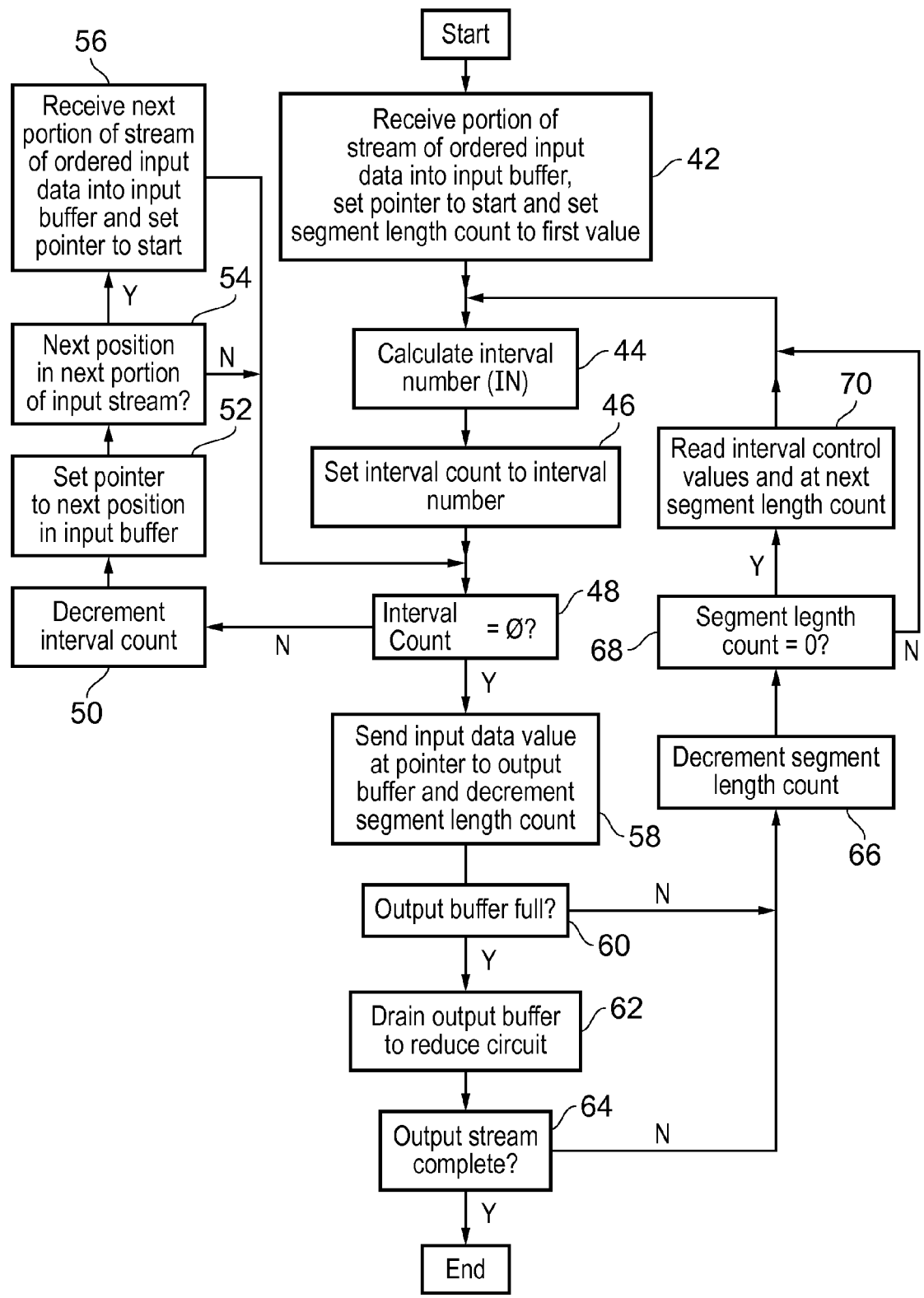
FIG. 7 is a flow diagram schematically illustrating the operation of the select circuit of FIG. 5.

FIG. 7 is a flow diagram schematically illustrating the operation of the select circuit 18. It will be appreciated that such flow diagrams necessarily represent the operation in a particular serial form, but it will be understood that in practice certain processing operations may be performed in parallel or in different order while still achieving the same overall function. Such variations are encompassed within the present techniques.

At step 42 the select circuit 18 is initialised by reception of a first portion of the ordered stream of input data values to the input buffer 26, the setting of the pointer to the start of that input buffer and the setting of the segment length count to a first value read from the memory 40. Step 44 then calculates the interval value IN to be used. Step 46 then sets the interval count to the interval number. Step 48 determines whether the interval count is zero. The interval count may be zero on a first pass if it is desired to output multiple copies of an input data value from the input buffer 26 to the output 30.

If the interval count is not zero, then processing proceeds to step 50 where the interval count is decremented. Step 52 then sets the pointer within the input buffer 26 to the next position within the input buffer 26. Step 54 determines whether or not the next position is in fact within the next portion of the input data stream indicating that the refill circuitry 30 should fetch that next portion of the ordered stream of input data values. If the input position is in the next stream, then step 56 fetches the next portion of the ordered stream of input data to the input buffer 26 and sets the pointer to the start of that next portion. If the determination at step 54 was that the next position was not in the next portion, then step 56 is bypassed. Following either step 44 or step 56, processing returns to step 48 where another determination is made as to whether or not the interval count has yet reached zero.

It will be appreciated that in this example the interval number and the interval count have been considered as integers. Whilst the interval number corresponding to the number of input data values skipped between selections will always be an integer, the interval number could be represented by a fix point decimal number with rounding applied to generate an appropriate interval number to control the selection. The use of such a fixed point representation may improve accuracy and increase the resolution with which a linear variation may be specified.

If the determination at step 48 is that the interval count has reached zero, then processing proceeds to step 58 where the input data value at the current pointer position is sent to the output buffer 30 and the segment length is decremented. Step 60 then determines whether or not the output buffer 30 is full. If the output buffer 30 is full, then processing proceeds to step 52 where the drain circuitry 32 serves to control output of the completed portion of the ordered stream of output data values to the reduce circuit 20 at step 64. If the output buffer 30 is not full, then steps 62 and 64 are bypassed and processing proceeds directly to step 66. Step 66 decrements the segment length count. Step 68 then determines whether or not the segment length count has reached zero. If the segment length count has reached zero, then step 70 serves to read the interval control values from the memory 40 so as to set the next segment length count. Processing then returns to step 44 where the next interval number is calculated. Step 64 serves to determine whether or not the end of the output stream has been reached and, if so, terminates the processing to form the particular ordered stream of output data values concerned.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
one or more groups of select circuits, each group of select circuits comprising one or more select circuits and each select circuit comprising:
an input configured to receive an ordered stream of input data values;
select interval generation circuitry configured to determine an interval number of input data values between each data value to be selected for output from among said ordered stream of input data values, said interval number varying with position within said ordered stream of input data values;
an output configured to receive an ordered stream of output data values; and
a transfer circuit configured to respond to said interval number by sending each said data value selected for output to said output.

2. Apparatus as claimed in claim 1, wherein said input comprises an input buffer configured to store a portion of said ordered stream of input data values.

3. Apparatus as claimed in claim 2, wherein said select circuit comprises
refill circuitry coupled to said input buffer and configured to refill said input buffer with a next portion of said stream of input data values when said interval number indicates that a next data value to be selected for output is within said next portion.

4. Apparatus as claimed in claim 1, wherein said output comprises an output buffer configured to store a portion of said ordered stream of output data values.

5. Apparatus as claimed in claim 4, wherein said select circuit comprises
drain circuitry coupled to said output buffer and configured to output from said output buffer said output data values stored within said output buffer in an order corresponding to an order of selection using said interval number.

6. Apparatus as claimed in claim 1, wherein said interval number is an integer of zero or greater, whereby an interval number of zero corresponds to an input data value sent successively multiple times to said output.

7. Apparatus as claimed in claim 1, wherein said select circuit includes a memory storing a plurality of interval control values and said select interval generation circuitry determines said interval number in dependence upon said plurality of interval control values.

8. Apparatus as claimed in claim 7, wherein said memory is a programmable memory whereby said plurality of interval control value are programmable to change said determination of said interval numbers.

9. Apparatus as claimed in claim 1, wherein said select interval generation circuitry is configured to determine said interval number using an iterative calculation whereby each newly calculated interval number is dependent upon an immediately preceding interval number calculated by said select circuit.

10. Apparatus as claimed in claim 1, comprising transform circuitry configured to perform a transform operation upon an ordered stream of raw data values to generate said stream of input data values.

11. Apparatus as claimed in claim 10, wherein each group of select circuits comprises a plurality of select circuits connected in parallel to said transform circuitry to receive said stream of input data therefrom.

12. Apparatus as claimed in claim 10, wherein said transform circuitry perform an interpolation operation to interpolate additional data values between data values within said ordered stream of raw data values to generate said stream of input data values.

13. Apparatus as claimed in claim 1, comprising a plurality of said groups of select circuits each coupled to a respective one of a plurality of reduce circuits, each of said plurality of reduce circuits configured to received one or more ordered streams of output data values from respective select circuits within a group of select circuits.

14. Apparatus as claimed in claim 13, wherein said plurality of reduce circuits are coupled together and configured to combine corresponding ordered streams of output data values from different groups of selects circuits to form one or more ordered steams of combined data values.

15. Apparatus as claimed in claim 14, wherein said plurality of reduce circuits are configured to accumulate corresponding output data values across said different groups of select circuits.

16. Apparatus as claimed in claim 15, wherein said plurality of reduce circuits are connected in a chain with partially accumulated output data values passed between reduce circuits until all of said corresponding output data values have been accumulated and an ordered stream of combined data values has been formed and is ready for output.

17. Apparatus as claimed in claim 1, wherein said apparatus is configured to perform beam forming computations.

18. Apparatus for processing data comprising:
one or more groups of select circuits, each group of select circuits comprising one or more select circuits and each select circuit comprising:
input means for receiving an ordered stream of input data values;
select interval generation means for determining an interval number of input data values between each data value to be selected for output from among said ordered stream of input data values, said interval number varying with position within said ordered stream of input data values;
output means for receiving an ordered stream of output data values; and
transfer means for responding to said interval number by sending each said data value selected for output to said output means.

19. A method of processing data using one or more groups of select circuits, each group of select circuits comprising one or more select circuits, said method comprising performing the steps within each select circuit of:
receiving an ordered stream of input data values;
determining an interval number of input data values between each data value to be selected for output from among said ordered stream of input data values, said interval number varying with position within said ordered stream of input data values; and
responding to said interval number by sending each said data value selected for output to an output.

* * * * *